United States Patent
Bulzacchelli et al.

(10) Patent No.: US 8,085,841 B2
(45) Date of Patent: Dec. 27, 2011

(54) SAMPLED CURRENT-INTEGRATING DECISION FEEDBACK EQUALIZER AND METHOD

(75) Inventors: John F. Bulzacchelli, Yonkers, NY (US); Timothy O. Dickson, Danbury, CT (US); Daniel J. Friedman, Sleepy Hollow, NY (US); Alexander V. Rylyakov, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 12/061,268

(22) Filed: Apr. 2, 2008

(65) Prior Publication Data

US 2009/0252215 A1 Oct. 8, 2009

(51) Int. Cl.
*H04L 27/01* (2006.01)

(52) U.S. Cl. ......... 375/233; 375/229; 375/230; 375/232

(58) Field of Classification Search ............. 375/233, 375/229, 230, 232; 708/300, 323, 819
See application file for complete search history.

(56) References Cited

U.S. PATENT DOCUMENTS

| 4,422,175 A | 12/1983 | Bingham et al. |
| 2003/0165208 A1 | 9/2003 | Carter et al. |
| 2006/0291552 A1* | 12/2006 | Yeung et al. ........... 375/233 |
| 2007/0147559 A1* | 6/2007 | Lapointe ............ 375/350 |

OTHER PUBLICATIONS

Emami-Neyestanak et al., A Low-Power Receiver with Switched-Capacitor Summation DFE; 2006 Symposium on VLSI Circuits Digest of Technical Papers; 2006; pp. 192-193.
Grozing et al., Sampling Receiver Equalizer with Bit-Rate Flexible Operation up to 10 Gbit/s; IEEE; 2006 pp. 51-519.
T. Beukema et al., A 6.4-Gb/s CMOS SerDes Core with Feed-Forward and Decision-Feedback Equalization, IEEE J. Solid-State Circuits, vol. 40, pp. 2633-2645, Dec. 2005.

* cited by examiner

*Primary Examiner* — Dhaval Patel
(74) *Attorney, Agent, or Firm* — Tutunjian & Bitetto, P.C.; Anne V. Dougherty

(57) ABSTRACT

A decision feedback equalizer (DFE) and method including a branch coupled to an input and including a sample-and-hold element configured to receive and sample a received input signal from the input and a current-integrating summer. The current-integrating summer is coupled to an output of the sample-and-hold element. The summer is configured to receive and sum currents representing at least one previous decision and an input sample. The at least one previous decision and the input sample are integrated onto a node, wherein the input sample is held constant during an integration period, thereby mitigating the effects of input transitions on an output of the summer.

20 Claims, 13 Drawing Sheets

SAMPLED CURRENT-INTEGRATING DECISION FEEDBACK EQUALIZER AND METHOD

BACKGROUND

1. Technical Field

The present invention relates generally to equalization techniques for high-speed data communications and more specifically to implementations of decision feedback equalizer (DFE) circuits with improved performance.

2. Description of the Related Art

With advances in digital computing capabilities fueled by scaling of semiconductor technologies, demands for high-bandwidth transmission of data in systems such as servers and data communication routers continue to increase. However, the limited bandwidth of electrical channels makes it difficult to increase data rates beyond a few gigabits per second. Channel bandwidth degradation is the result of many physical effects, including skin effect, dielectric loss, and reflections due to impedance discontinuities. Consequently, high data rate pulses transmitted through these channels will broaden to greater than a unit interval (UI), thus creating intersymbol interference (ISI) with preceding bits (precursors) and succeeding bits (postcursors).

One method of compensating signal distortion due to ISI is to add equalization to the transmitting or receiving circuitry. In particular, a nonlinear decision feedback equalizer (DFE) is preferred over linear equalization techniques for equalizing high-loss channels. Unlike linear equalizers, a DFE reduces signal distortion without amplifying noise or crosstalk from adjacent channels, making it well-suited for equalizing channels where the loss exceeds, e.g., 20-30 dB.

In a DFE, previous bit decisions are fed back with weighted tap coefficients and added to the received input signal. The tap coefficients are adjusted, either manually or by means of an adaptive algorithm, to match the inverse of the channel characteristics. Consequently, ISI is removed from the received input signal such that a decision can be made on the received bit with a low bit error rate (BER). It is common for the addition function to be implemented using a current-mode logic (CML) analog summer. In such an implementation, current from multiple differential pairs is steered into a resistive load. The voltage at the output of the summer is proportional to a linear combination of the input signal plus the weighted feedback taps.

One drawback of this resistive approach is that as more feedback taps are added to compensate for multiple postcursors, the capacitive loading at the summation node increases hence degrading its settling time. While the load resistance can be decreased to improve settling time, this requires higher current levels and thus higher power consumption to achieve a desired differential output voltage.

SUMMARY

To alleviate the settling time requirements of the resistively loaded summer, a current-integrating summer can be employed to sum the input signal with the weighted decisions of previous bits. In this approach, the resistive loads of a CML-based summer are replaced by capacitive loads. A differential voltage is developed at the output based on the amount of current steered into the load over a fixed amount of time. At the end of the integration period (e.g., one UI long), a decision element makes the bit decision and the differential output voltage is reset.

By integrating current onto a capacitor, settling time requirements are eliminated. Moreover, it becomes feasible to increase the number of taps without significant power penalty, particularly if the capacitance associated with an additional tap is small compared to the integrator load capacitor.

One consequence of implementing a DFE with a current-integrating summer is the additional loss introduced by this block. Ideally, a received binary signal should be equal to the voltage level associated with a 1 or 0 bit over the entire unit interval. However, rise and fall times associated with the transition from a 1 to a 0 (or vice versa) can consume a non-negligible fraction of a UI. Unfortunately integration will continue during these transitions, resulting in a lower output voltage than in the ideal case where the input levels remain constant during the integration period.

It can be shown that the loss of a resettable integrator has a sin(x)/x frequency dependence. For a frequency equal to one-half of the symbol (or baud) rate and assuming a one UI integration period, this corresponds to an integrator loss of 3.9-dB in addition to channel and packaging losses. As a result, the signal-to-noise ratio of the equalized output is decreased making it even more difficult to compensate high-loss channels.

A decision feedback equalizer (DFE) and method including a branch coupled to an input and including a sample-and-hold element are configured to receive and sample a received input signal from the input and a current-integrating summer. The current-integrating summer is coupled to an output of the sample-and-hold element. The summer is configured to receive and sum currents representing at least one previous decision and an input sample. The at least one previous decision and the input sample are integrated onto a node, wherein the input sample is held constant during an integration period, thereby mitigating the effects of input transitions on an output of the summer.

A method for decision feedback equalization includes sampling an input signal to provide a sampled portion, holding the sampled portion at an input of a current-integrating summer and summing currents representing the sampled portion of the input signal with currents representing at least one previous decision tap during an integration period wherein the sampled portion is held constant during the integration period, thereby mitigating the effects of input transitions on an output of the summer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
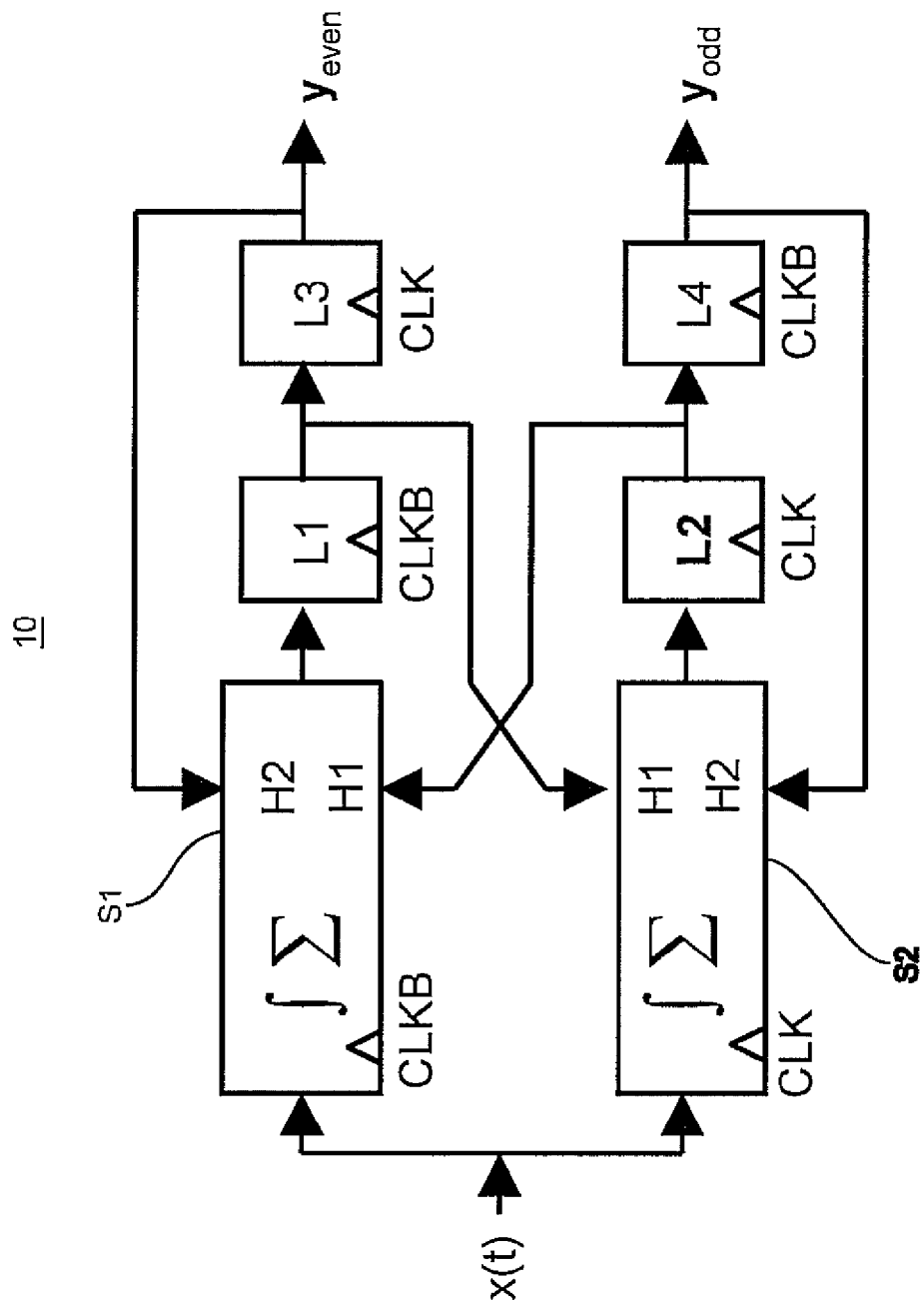
FIG. 1 is a schematic diagram of a prior art implementation of a decision-feedback equalizer with a current-integrating summation amplifier.

The present principles provide systems, circuits and methods for implementing a decision feedback equalizer (DFE) with a low-power current-integrating summer without incurring additional losses associated with an integrator as described above. The DFE architecture in accordance with useful embodiments includes a sampler followed by a current-integrating summer. A received input data signal is sampled and held constant during the integration period, thereby mitigating the effects of input transitions on the integrator output.

Embodiments of the present invention can take the form of an entirely hardware embodiment, an entirely software embodiment or an embodiment including both hardware and software elements. In one embodiment, the present invention may be implemented in software, which includes but is not limited to firmware, resident software, microcode, etc.

Furthermore, a circuit in accordance with the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described herein may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. The present embodiment may be applied to optical fiber transmission systems.

Figure 2:
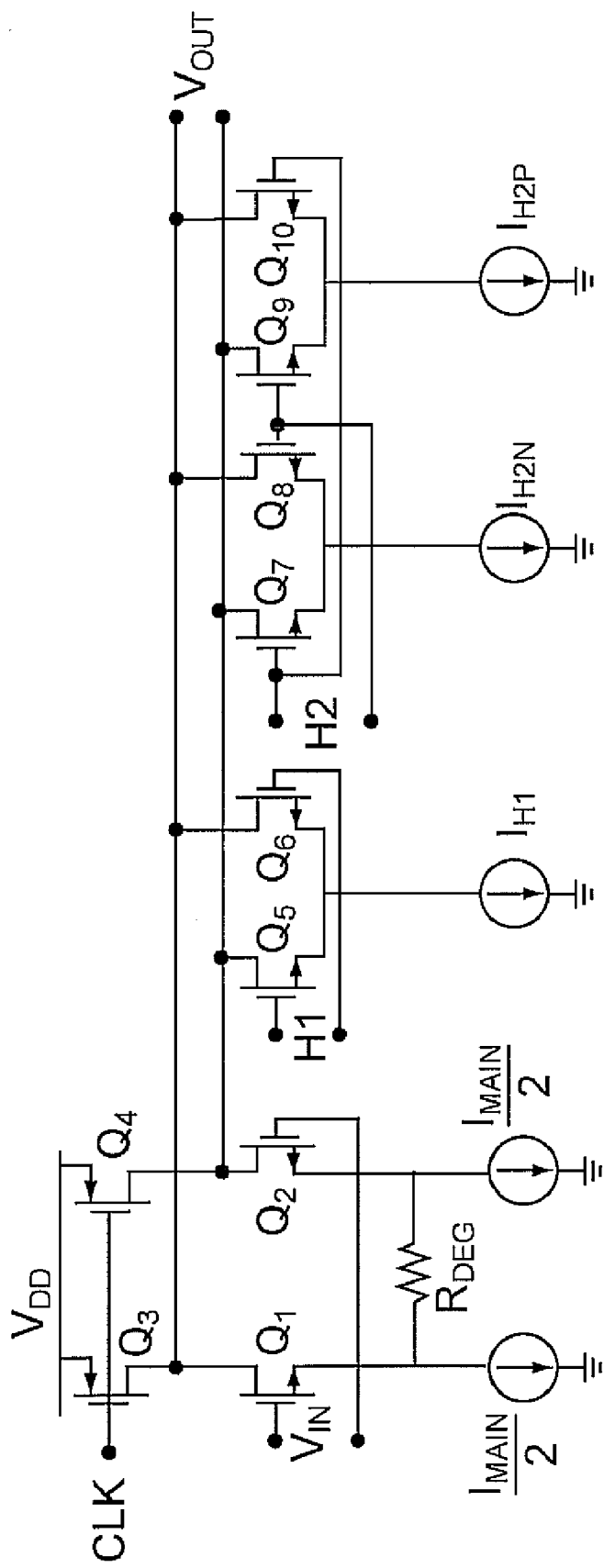
FIG. 2 is a schematic diagram of a CMOS implementation of the current-integrating summation amplifier employed in the DFE architecture of FIG. 1.

Referring now to the drawings in which like numerals represent the same or similar elements and initially to FIGS. 1 and 2, an implementation of a prior art half-rate decision feedback equalizer 10 with current-integrating summation amplifiers (S1 and S2) is shown. One possible CMOS implementation of a current-integrating summer stage is presented in FIG. 2. While a two-tap half-rate DFE architecture 10 is presented in FIG. 1, one skilled in the art can readily extend the use of the current-integrating summing amplifier to other DFE architectures, including speculative and non-speculative, with any number of feedback taps. The DFE in FIG. 1 includes decision element represented as latches L1, L2, L3 and L4, which have outputs to generate taps H1 and H2 based on clock signals CLK and CLKB (clock bar). The differential output of Latch L1 (or L2) in FIG. 1 is applied to the gates of transistors Q5 and Q6 in FIG. 2, while the differential output of Latch L3 (or L4) in FIG. 1 is applied to transistors Q7, Q8, Q9, and Q10 in FIG. 2.

To illustrate the basic operation of the summer, consider the case when H1 and H2 tap weight coefficients set by currents $I_{H1}$, $I_{H2P}$, and $I_{H2N}$ in FIG. 2 are all zero. A differential input signal is applied to the gates of the differential pair formed by transistors Q1 and Q2, which may or may not include resistive degeneration ($R_{DEG}$ as seen in FIG. 2) depending on linearity requirements. A clock timing signal (CLK) is applied to the gates of the PMOS loads Q3 and Q4 connected to the drains of Q1 and Q2.

When CLK is high, the PMOS devices Q3 and Q4 are turned off. In this case, the differential pair Q1 and Q2 produces differential currents proportional to the differential input signal ($V_{in}$). These currents are integrated onto capacitance at drain nodes of Q1 and Q2, and a differential voltage is produced at the output of the summer ($V_{out}$) in response to the applied input signal ($V_{in}$).

At the end of the integration, a decision circuit such as latch L1 in FIG. 1 makes a decision on the polarity of the received bit. CLK then becomes low, and PMOS transistors Q3 and Q4 turn on to reset the output signal by pulling the drains of Q1 and Q2 to the supply voltage $V_{DD}$.

It is pointed out that in the implementation of FIG. 2, the current $I_{MAIN}$ will still flow through Q3 and Q4 during this reset state and hence the outputs will not exactly equal $V_{DD}$. To alleviate this problem, transistors Q3 and Q4 have large gate widths such that their "on" resistance in the triode region of operation is low.

Alternatively, note that in a half-rate architecture one summing amplifier (S1 or S2) integrates current while the other (S2 or S1) is reset. This makes it possible to share the bias current in the main linear amplifier between the summers S1 and S2 such that no current flows through the PMOS transistors Q3 and Q4 during the reset operation.

In the more general case where x(t) in FIG. 1 is an input signal including ISI from previous bits, previous decisions can be fed back to steer tap weight currents $I_{H1}$, $I_{H2P}$, and $I_{H2N}$ in FIG. 2 such that the ISI is partially or completely removed in the signal at the output of the integrating summer (S1 and/or S2). In the summer implementation of FIG. 2, the sign of the H2 tap coefficient is set to positive by turning off $I_{H2N}$ and setting current source $I_{H2P}$ to the appropriate tap weight. Alternatively, $I_{H2P}$ can be set to zero and $I_{H2N}$ set to the appropriate current level to produce a negative tap coefficient. H1 sign selection is not implemented, as it is assumed that the coefficient is always negative; however, sign selection for this tap could be implemented in the same manner described for H2. For all feedback taps, the magnitude of the tap coefficient can be determined by some adaptation method.

In the prior art DFE with current-integrating summer shown in FIG. 1, changes to the input signal $V_{in}$ during the integration period of 1 UI will result in a change in the amount of differential current produced by transistors Q1 and Q2 of FIG. 2. If the differential input signal $V_{in}$ decreases during the integration period, the rate of change in the output voltage $V_{out}$ will also decrease and the differential output signal will be lower at the end of the integration period.

Consequently, the current-integrating summer exhibits frequency-dependent loss. Consider the case when the input signal is a sinusoid with a peak amplitude of A and a frequency equal to half the data symbol rate. If this input waveform were to be applied directly to a slicer, the optimal time to make a bit decision would be when the waveform reaches its maximum value. However, if this input waveform is first integrated before being applied to the slicer, the ideal integration window coincides with the time between the zero crossings of the half-baud sinusoid.

Figure 3:
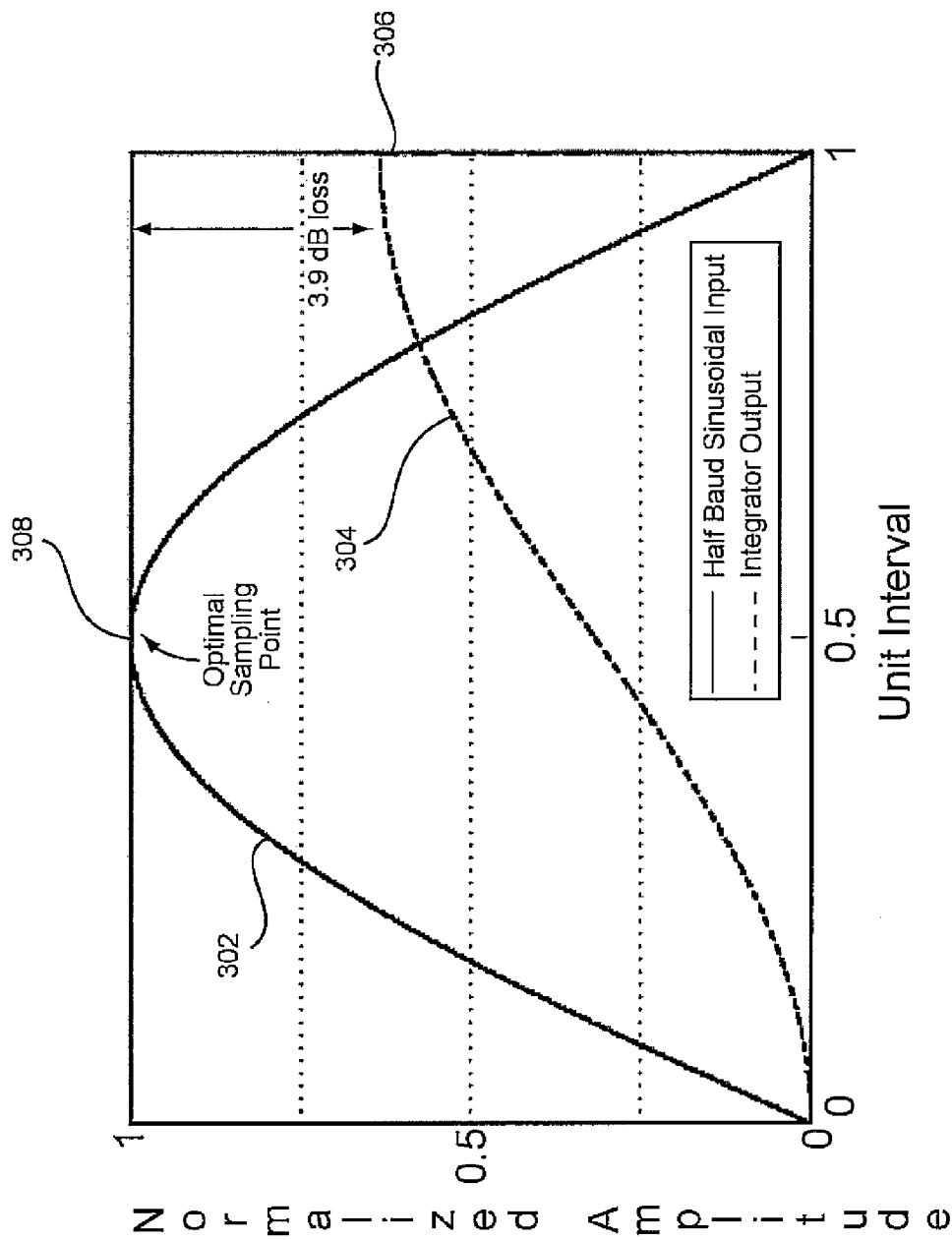
FIG. 3 is a plot of a sinusoidal input to a current-integrating amplifier with a frequency equal to half the baud rate, and a response of the resettable current-integrating amplifier over a 1 UT integration window illustrating a signal loss of 3.9 dB as compared with a value of the input waveform at the optimal sampling point.

Referring to FIG. 3, a plot of normalized amplitude versus unit interval is shown for a sinusoidal input 302 to a current-integrating amplifier with a frequency equal to half the baud rate. A response curve 304 of a resettable current-integrating amplifier over the 1 UI integration window illustrating a signal loss of 3.9 dB at point 306 as compared with the value of the input waveform at the optimal sampling point 308 is also shown. The magnitude of the output signal at the end of a 1-UI integration window 306 is reduced by $2/\pi$ as compared to the peak magnitude 308 of the input signal level, corresponding to a loss of 3.9 dB. As mentioned above, this loss assumes a 1-UI integration window. In general, it can be shown that the resettable integrator exhibits a $\sin(x)/x$ frequency response.

For a given slicer sensitivity, the additional loss will result in higher bit error ratio (BER) and degrade system performance when equalizing high-loss channels. One may attempt to eliminate this frequency-dependent integrator loss by inserting a peaking amplifier before the integrator to compensate for high-frequency signal attenuation. However, exact compensation of the $\sin(x)/x$ integrator response cannot be achieved through this method. Moreover, the addition of a peaking amplifier will lead to higher noise, reduced linearity, and most likely higher power dissipation in the receiver.

Figure 4:
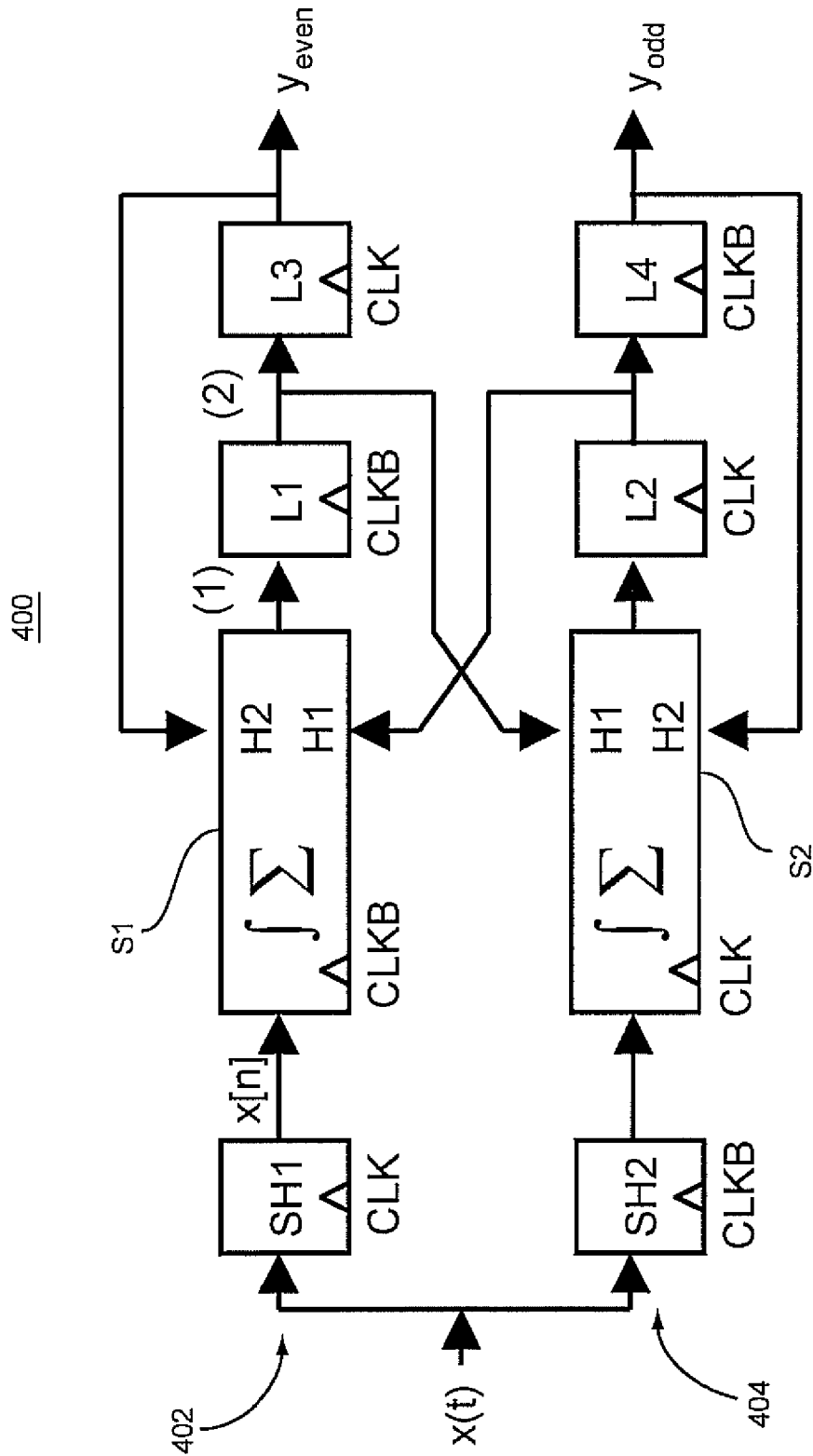
FIG. 4 is a half-rate DFE architecture with sample-and-hold stages and current-integrating summing stages representing one illustrative embodiment.
Figure 5:
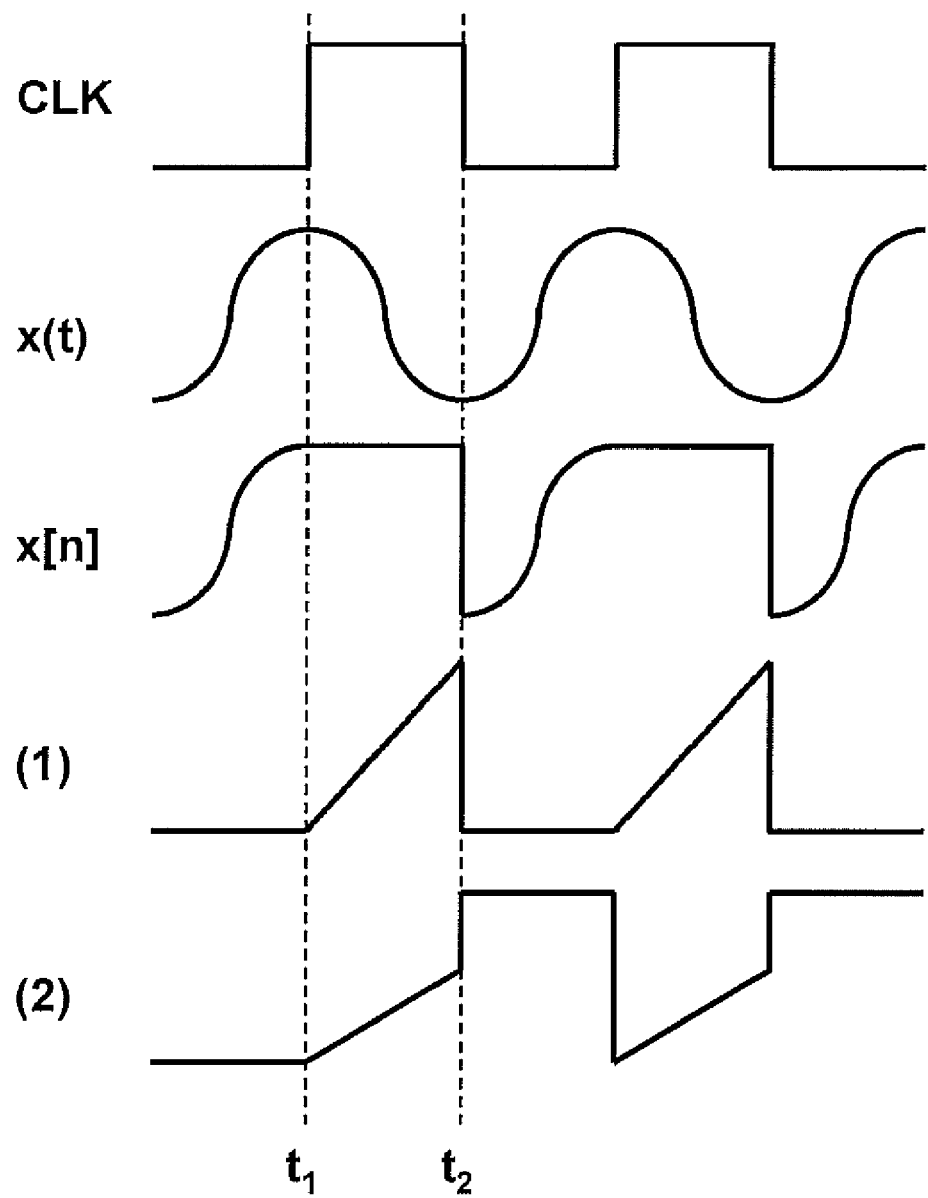
FIG. 5 is a timing diagram of the DFE architecture shown in FIG. 4 in response to a sinusoidal input with a frequency equal to half the baud rate.

The present principles described herein eliminate integrator loss by integrating a sampled waveform rather than the continuous-time input. A modified half-rate DFE architecture with input sampling circuits is depicted in FIG. 4. To illustrate the operation of this architecture, relevant waveforms are shown in FIG. 5 for an input sinusoid with a frequency equal to half the baud rate. These waveforms do not account for finite delays through the various circuit blocks of FIG. 4. For simplicity, FIG. 5 illustrates the operation when feedback tap coefficients are turned off.

Referring to FIG. 4, a DFE 400 includes two branches 402 and 404. In this case, branch 402 outputs data associated with even intervals or bits ($y_{even}$), and branch 404 outputs data associated with odd intervals or bits ($y_{odd}$). An input function x(t) represents information received by the DFE 400 which may include ISI information or other signal in need of equalization. In the present example, input x(t) includes sinusoidal wave (FIG. 5).

Each branch 402 and 404 respectively includes: a sample and hold circuit SH1 and SH2, a current-integrating summer S1 and S2 and latches (L1, L3) and (L2, L4). DFE 400 illustratively depicts a half-rate architecture. This architecture may be extended to full rate architectures, quarter rate architectures, and so on.

Referring to FIG. 5 with continued reference to FIG. 4, at a time $t_1$, CLK goes high and the sample-and-hold circuit SH1 samples the input sinusoid x(t) at its maximum value. In practice, a clock-and-data recovery circuit (not illustrated) would align the phase of the clock such that all samples are taken at the optimal sampling points in the center of the bit interval. After t1, the sample-and-hold circuit SH1 holds the sampled value x[n]. A time interval t1 to t2 represents the integration window or period during which the integrating summer S1 responds to the sampled input x[n]. During this time, one advantage in accordance with the present principles is realized. This includes that the integrator S1 is not affected by changes to x(t) during the integration window. Also, between times t1 and $t_2$, latch L1 is transparent (e.g., acts as an amplifier) and the signal at node (2) tracks that at node (1), preferably with some gain. At time $t_2$, CLK goes low and a bit decision is made as L1 regenerates and latches its data. Additionally, the current-integrating summer S1 resets its output and the sample-and-hold SHI begins tracking x(t).

Although not depicted in the timing diagram of FIG. 5, after time $t_2$ sample-and-hold SH2 will operate in hold mode and the integration window for current-integrating summer S2 will begin. A generalized timing diagram representative of the response at various nodes of the DFE 400 to random non-return-to-zero (NRZ) data is depicted in FIG. 6.

Figure 6:
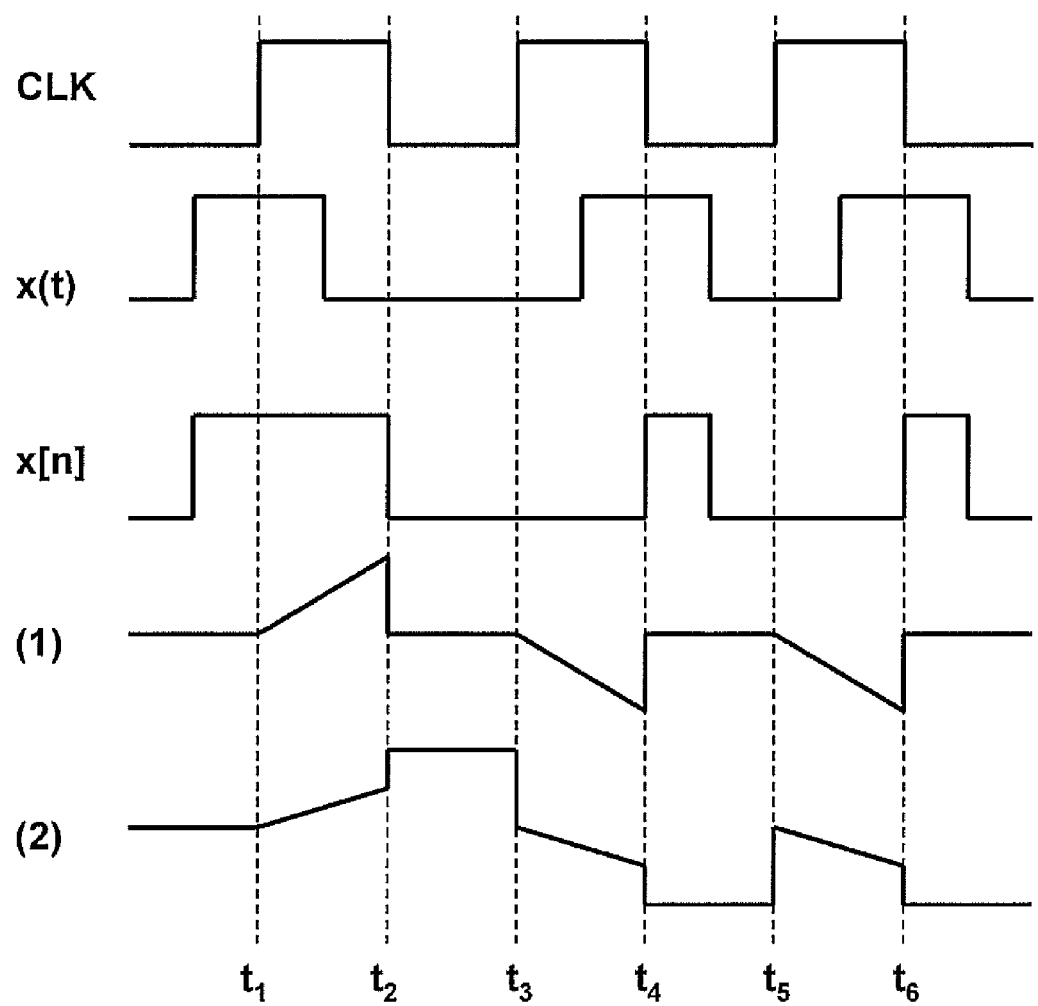
FIG. 6 is a timing diagram of the DFE architecture shown in FIG. 4 in response to binary data.

Referring to FIG. 6 with continued reference to FIG. 4, while the basic operation depicted in FIG. 6 is the same as FIG. 5, FIG. 6 shows the response of integrating summer S1 in situations where x[n] is a logic '1' or a logic '0' responsive to a digital input signal for x(t) as opposed to the analog sinusoid for input x(t). Note that the waveforms in FIGS. 5 and 6 represent the differential signals at each of the respective nodes.

As mentioned above, the timing diagrams of FIGS. 5 and 6 do not account for finite delays through the various circuit blocks depicted in FIG. 4. In situations where the CLK-to-Q delay of latches L1 or L2 are significant fractions of a UI, it is often desirable to use a speculative architecture (sometimes referred to as loop unrolling in the art).

Figure 7:
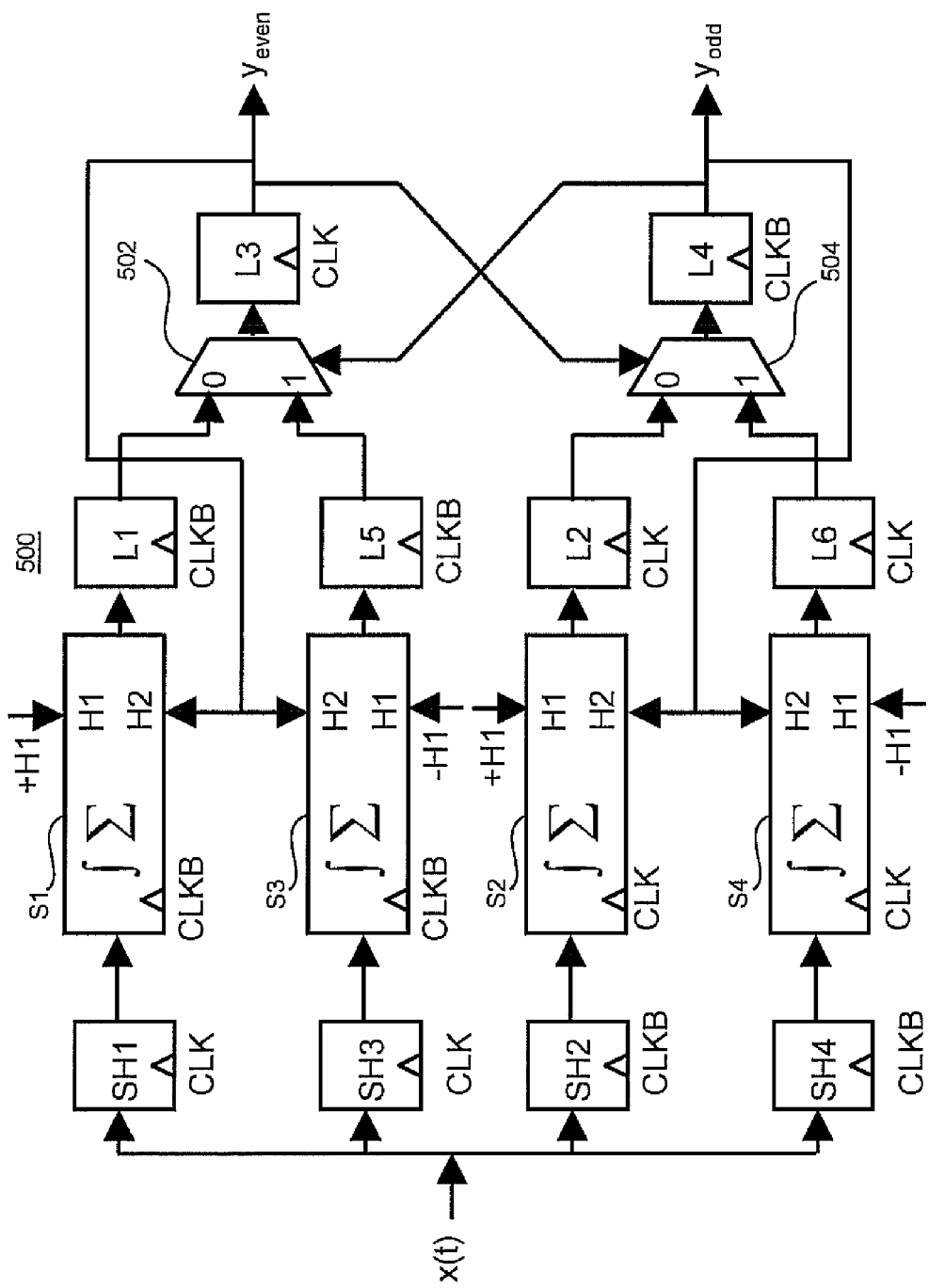
FIG. 7 is a block diagram of a speculative half-rate DFE architecture employing sample-and-hold and current-integrating summer stages in accordance with another embodiment.

Referring to FIG. 7, a speculative half-rate DFE architecture 500 employing sample-and-holds and current-integrating summers in the branches is illustratively depicted in accordance with another embodiment. Since sample-and-hold blocks SH1 and SH3 (or SH2 and SH4) operate on a same clock phase, they may be combined into a single sample-and-hold element. Further, the output of latches L1 and L5 and latches L2 and L6 are respectively provided to multiplexers 502 and 504.

Multiplexer 502 provides an output to a latch L3, and multiplexer 504 provides an output to a latch L4. The outputs of latches L3 and L4 are cross-coupled to multiplexers 504 and 502 to provide a select signal for controlling the outputs of the multiplexers. The outputs of latches L3 and L4 also provide feedback taps H2 to current-integrating summers S1 and S3 and current-integrating summers S2 and S4, respectively. +H1 and −H1 represent static offsets used in a speculative architecture. In the speculative architecture of FIG. 7, H1 is a static tap or static speculative tap. In this look-ahead architecture, one path assumes the previous bit was a '1' (−H1), and the other assumes the previous bit was a '0' (+H1). The multiplexer 502 (or 504) following latches L1 and L5 (or L2 and L6) then selects the correct path once the previous bit in question has been determined.

Figure 8A:
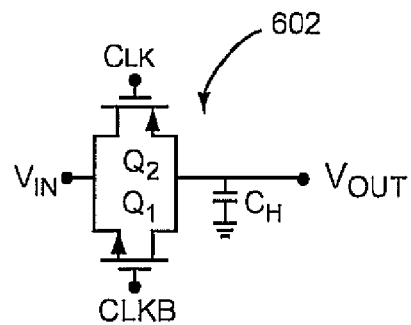
FIGS. 8A-8D are schematic diagrams showing possible implementations of sample-and-hold stages in various semiconductor technologies such as CMOS transmission gate (FIG. 8A), CMOS switched source follower (FIG. 8B), bipolar switched emitter follower (FIG. 8C) and a diode bridge (FIG. 8D)
Figure 8B:
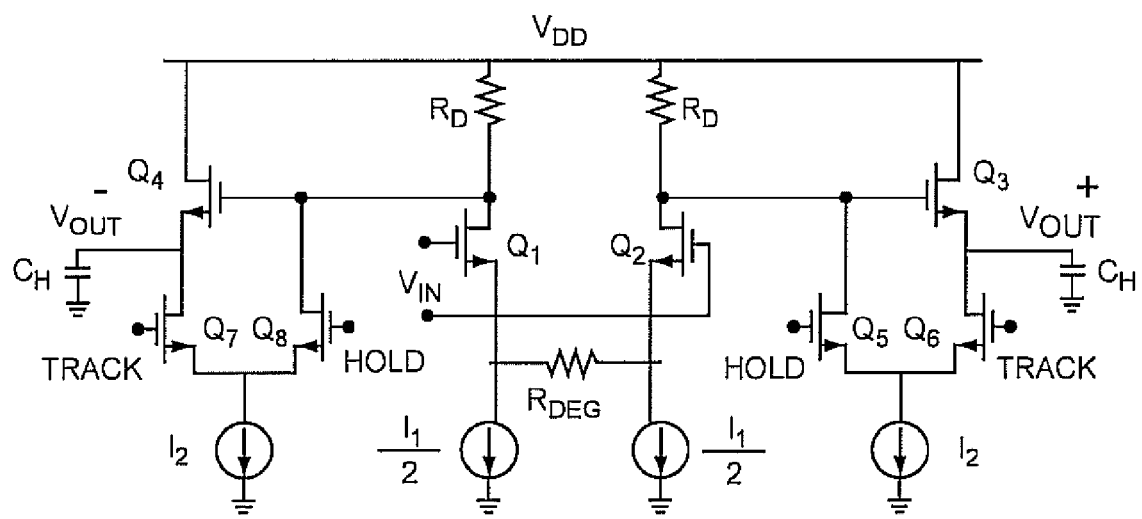
Figure 8C:
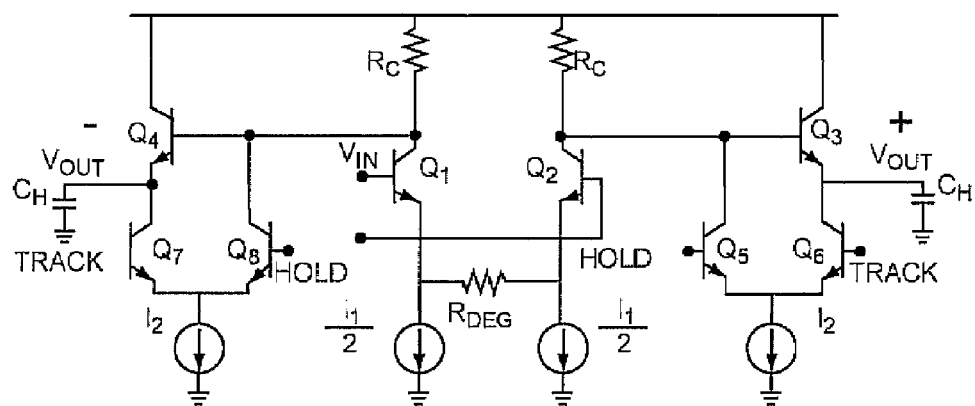
Figure 8D:
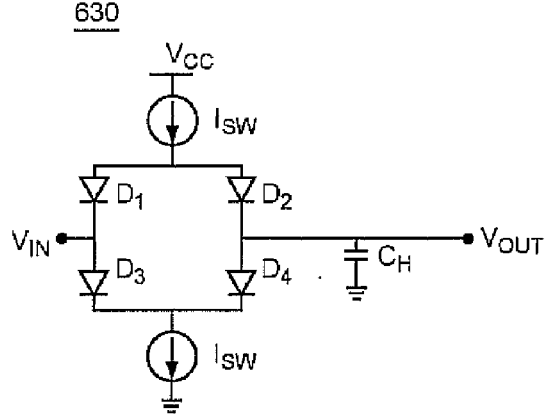

The disclosed sampled current-integrating DFE 500 (and 400) is not dependent on the implementation of the various stages presented in the architectures of FIGS. 4 and 7. A plurality of different technologies may be employed to realize advantageous effects in accordance with the present principles as depicted in FIGS. 8A-8D. For example, the sample-and-hold (SH) may be provided in CMOS technology and can be implemented as a transmission gate 602 as shown in FIG. 8A. In another embodiment, a higher-speed sample-and-hold (SH) may be implemented using a switched source follower circuit 610 shown in FIG. 8B. In yet another implementation, a common bipolar sample-and-hold circuit 620 including switched emitter followers (similar to circuit 610) may be employed for the sample-and hold circuit (SH) in FIG. 8C. $R_C$ and $R_D$ are resistors. In still another embodiment, a diode bridge circuit 630 may be employed as shown in FIG. 8D, where diodes $D_1$-$D_4$ are employed. In all cases, a hold capacitance $C_H$ of the sample-and-hold circuits (602, 610, 620, 630) can be realized using an on-chip capacitor or the parasitic input capacitance of a summing amplifier (S).

Figure 9A:
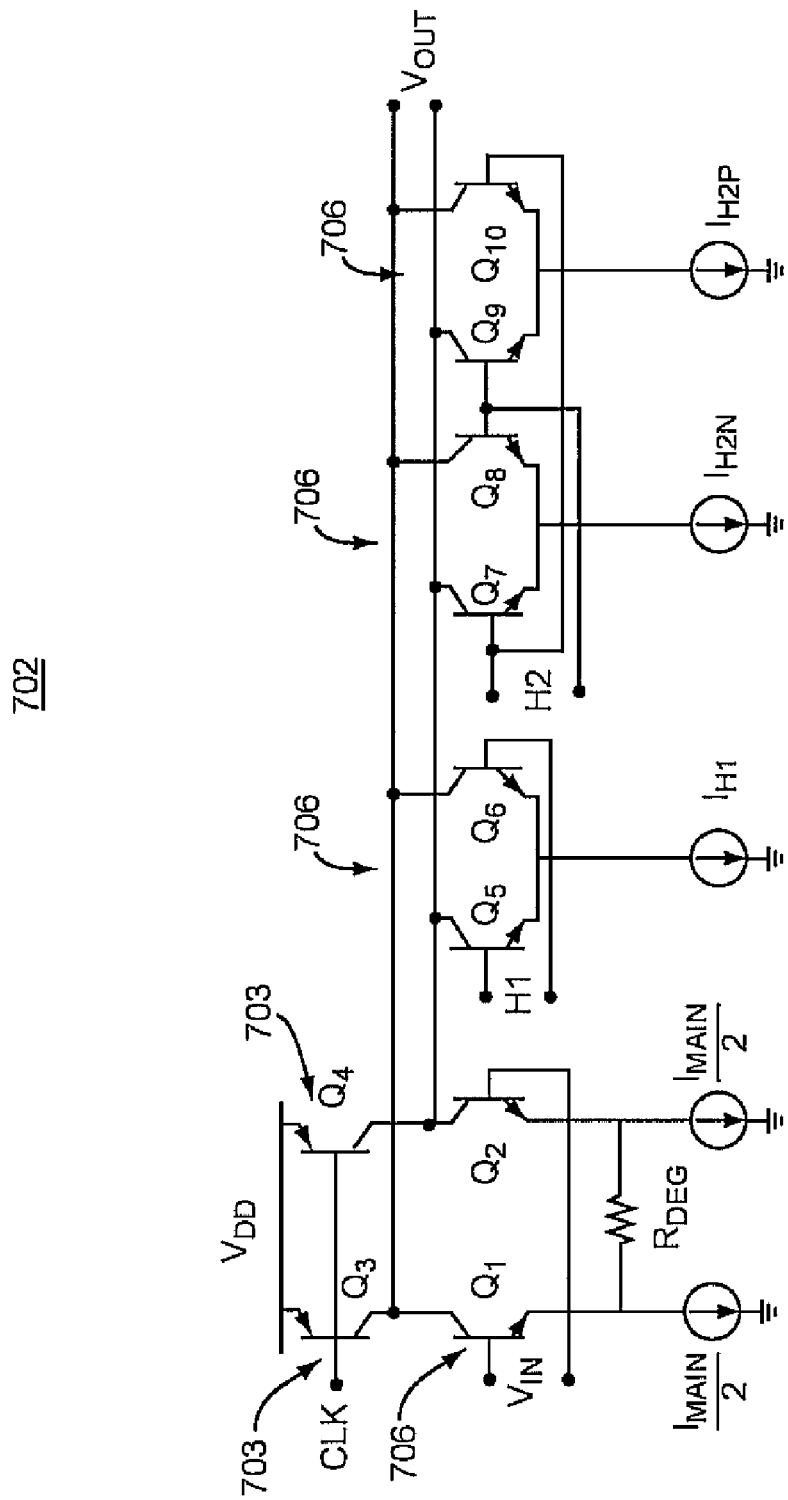
FIGS. 9A-9B show schematic diagrams for possible implementations of current-integrating summing amplifiers in bipolar technology (FIG. 9A) and BiCMOS technology (FIG. 9B)
Figure 9B:
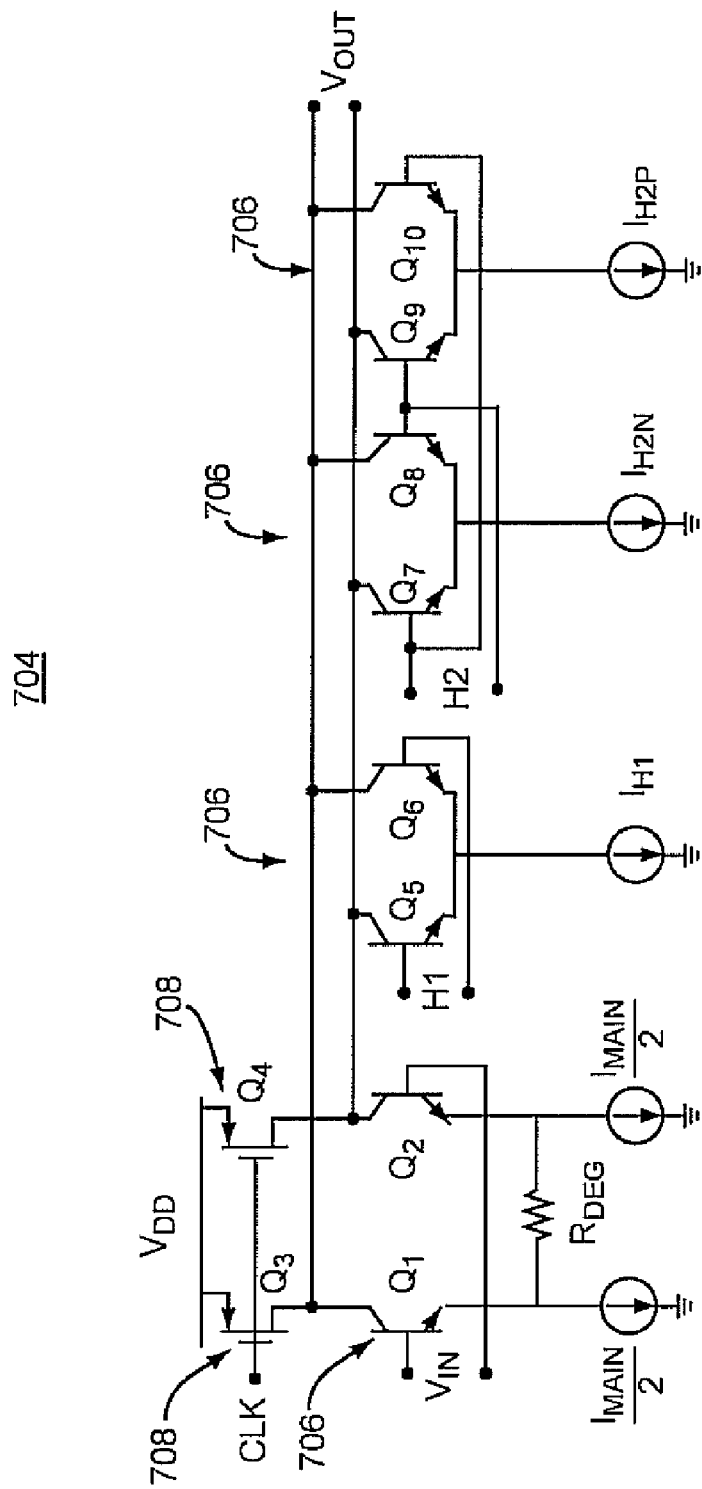

A current-integrating summing amplifier (S) may also be realized in a plurality of different technologies, for example, in bipolar and BiCMOS technologies. FIGS. 9A and 9B show illustrative implementations of the current-integrating summing amplifier (S). Referring to FIG. 9A, a bipolar implementation for a current-integrating summing amplifier 702 (S) using pnp loads 703 and bipolar npn differential stages 706 is illustratively shown. Referring to FIG. 9B, a BiCMOS implementation for a current-integrating summing amplifier 704 (S) using bipolar npn differential stages 706 with PMOS loads 708 is shown.

Figure 10:
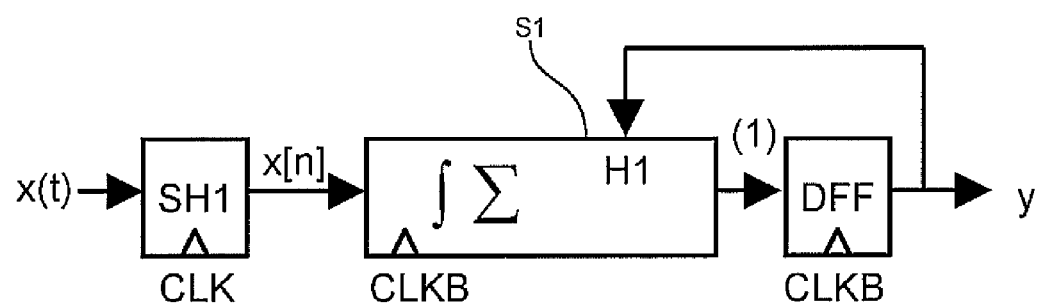
FIG. 10 is a full-rate DFE architecture with a sample-and-hold stage and current-integrating summing stage representing one embodiment.
Figure 11:
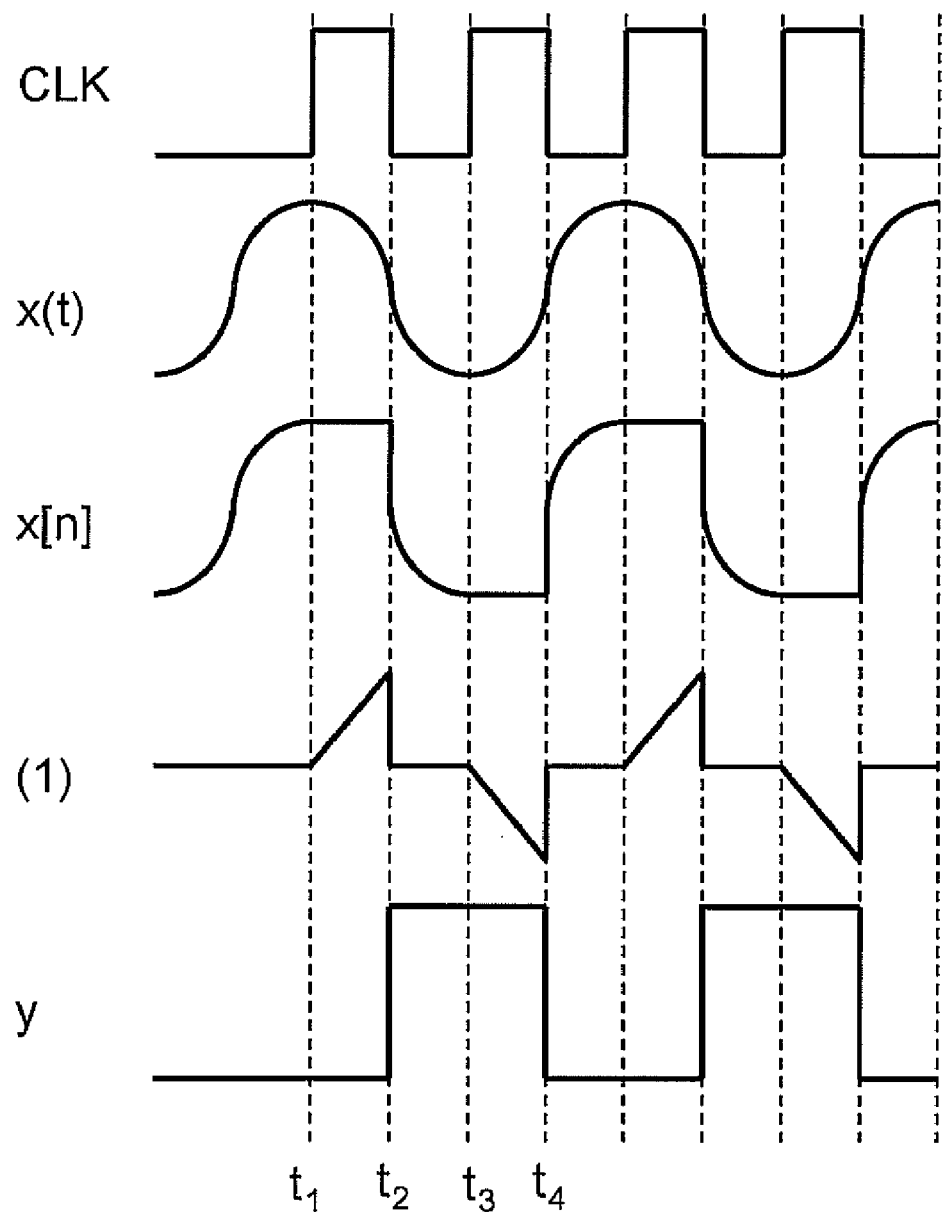
FIG. 11 is a timing diagram of a full-rate DFE architecture shown in FIG. 10 in response to a sinusoidal input with a frequency equal to half the baud rate.

In accordance with the present principles, a full-rate architecture may also be employed. Referring to FIG. 10, a DFE 800 with a sample-and-hold (SH1) front-end and current-integrating summer (S1) in a full-rate architecture is illustratively shown. In one possible embodiment, the full-rate one-tap DFE 800 includes a sample-and-hold element SH1, a current-integrating summer S1, and a D-type flip-flop (DFF). When the clock signal CLK is low (and hence CLKB is high), it is assumed that the sample-and-hold circuit SH1 tracks the input x(t) and the output voltage of the integrator or summer S1 is reset to a differential zero. The DFF is preferably triggered on falling edges of CLK. A timing diagram is shown in FIG. 11 to illustrate operation of the full-rate architecture 800 in response to a sinusoidal input with a frequency equal to half the baud rate. For simplicity, these waveforms do not account for the finite delays through each of the blocks in FIG. 10. Furthermore, the H1 tap coefficient is assumed to be zero. At time $t_1$, the input waveform is sampled and integrating summer S1 integrates in response to the sampled voltage. At time $t_2$, the sample-and-hold circuit SH1 tracks the input signal, the integrator S1 resets to a differential zero, and the DFF makes a decision based on the value of the integrated voltage at the instant when CLK goes low.

Note H1, H2, H3 represent taps from a previous decision 1 bit away, 2 bits away, 3 bits away, etc., and tap coefficients are weights that are employed to determine a tap's strength.

Other modifications and variations of the disclosed embodiments are also within the scope of the present principles. Such variations may include, for example, a quarter-rate instead of half-rate architecture, or other sample-and-hold or integrating summer implementations. The DFE in accordance with the present principles can have one or more dynamic feedback taps, and/or one or more static speculative taps. Such modifications and variations will be obvious to those skilled in the art in view of the teachings of the present disclosure.

Having described preferred embodiments for sampled current-integrating decision feedback equalizers and methods (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A decision feedback equalizer (DFE), comprising:
   at least one branch coupled to an input and including:
   a sample-and-hold circuit configured to receive and sample a received input signal from the input; and
   a current-integrating summer coupled to an output of the sample-and-hold element, the summer configured to receive and sum currents representing at least one previous decision and an input sample, the at least one previous decision and the input sample being integrated onto a node, wherein the input sample is held constant during an integration period, thereby mitigating the effects of input transitions on an output of the summer, wherein the sample and hold circuit operates in a tracking mode during a same clock phase that the summer resets, and the sample and hold circuit operates in a hold mode during the same clock phase that the summer integrates.

2. The DFE as recited in claim 1, wherein the at least one branch further comprises a first decision element having an input which receives the output of the summer and the first decision element having an output which controls the at least one previous decision.

3. The DFE as recited in claim 2, wherein the first decision element includes a latch.

4. The DFE as recited in claim 2, further comprising a second decision element having an input which receives the output of the first decision element, and the second decision element having an output which controls a second previous decision tap for the summer of its corresponding branch.

5. The DFE as recited in claim 1, wherein a plurality of first decision elements of different branches are coupled to inputs of a multiplexer, the multiplexer outputting to a second decision element.

6. The DFE as recited in claim 5, wherein the second decision element includes an output signal, the output signal of the second decision element being employed as a select signal for a second multiplexer of another branch.

7. The DFE as recited in claim 4, wherein the first decision element is clocked by one of a clock signal and a clock bar signal and the second decision element is clocked by the other of the clock bar signal and the clock signal.

8. The DFE as recited in claim 1, wherein the at least one previous decision includes at least one of a static tap, a dynamic tap or a combination thereof.

9. A decision feedback equalizer (DFE), comprising:
a plurality of branches, each branch coupled to an input and including:
a sample-and-hold circuit configured to receive and sample a received input signal from the input;
a current-integrating summer coupled to an output of the sample-and-hold element, the summer configured to receive and sum currents representing at least one previous decision and an input sample, which are integrated onto a node, wherein the input sample is held constant during an integration period, thereby mitigating the effects of input transitions on an output of the summer;
a first latch having an input which receives the output of the summer and remains transparent during the integration period; and
a second latch having an input which receives the output of the first latch,
wherein the sample and hold circuit operates in a tracking mode during a same clock phase that the summer resets, and the sample and hold circuit operates in a hold mode during the same clock phase that the summer integrates.

10. The DFE as recited in claim 9, wherein a plurality of first latches of different branches are coupled to inputs of a multiplexer, the multiplexer outputting to the second latch.

11. The DFE as recited in claim 10, wherein the second latch includes an output signal, the output signal of the second latch being employed as a select signal for a different multiplexer.

12. The DFE as recited in claim 9, wherein the first latch is clocked by one of a clock signal and a clock bar signal and the second latch is clocked by the other of the clock bar signal and the clock signal.

13. The DFE as recited in claim 9, wherein the first latch includes an output which controls the at least one previous decision to a summer of another branch; and
the second latch includes an output which controls a second previous decision tap for the summer of its corresponding branch.

14. The DFE as recited in claim 9, wherein the at least one previous decision includes at least one of a static tap, a dynamic tap or a combination thereof.

15. A method for decision feedback equalization, comprising:
sampling an input signal to provide a sampled portion;
holding the sampled portion at an input of a current-integrating summer; and
summing currents representing the sampled portion of the input signal with currents representing at least one previous decision tap during an integration period wherein the sampled portion is held constant during the integration period, thereby mitigating the effects of input transitions on an output of the summer,
wherein a sample and hold circuit performing the sampling operates in a tracking mode during a same clock phase that the summer resets, and the sample and hold circuit operates in a hold mode during the same clock phase that the summer integrates.

16. The method as recited in claim 15, further comprising receiving an output of the summer by a first latch having an output which controls the at least one previous decision tap.

17. The method as recited in claim 16, further comprising receiving the output of the first latch by a second latch having an output which controls a second previous decision tap.

18. The method as recited in claim 15, further comprising multiplexing a plurality of first latches of different branches using a multiplexer and outputting a multiplexed signal from the multiplexer to a second latch.

19. The method as recited in claim 18, wherein the second latch includes an output signal, the method further comprising outputting an output signal of the second latch as a select signal for a different multiplexer.

20. The method as recited in claim 17, wherein the first latch is clocked by one of a clock signal and a clock bar signal and the second latch is clocked by the other of the clock bar signal and the clock signal.

* * * * *